(No Model.)

A. FEINER & T. G. SAXTON.
DEVICE FOR HOLDING COLLARS OR CUFFS ON SHIRTS.

No. 528,469. Patented Oct. 30, 1894.

Witnesses
Percy C. Bowen
John A. Wilson

Inventors
A. Feiner &
T. G. Saxton,
By Whitman & Wilkinson,
Attorneys.

THE NORRIS PETERS CO., PHOTO-LITHO., WASHINGTON, D. C.

UNITED STATES PATENT OFFICE.

ADOLPH FEINER AND THOMAS G. SAXTON, OF LEXINGTON, KENTUCKY.

DEVICE FOR HOLDING COLLARS OR CUFFS ON SHIRTS.

SPECIFICATION forming part of Letters Patent No. 528,469, dated October 30, 1894.

Application filed February 10, 1894. Serial No. 499,822. (No model.)

*To all whom it may concern:*

Be it known that we, ADOLPH FEINER and THOMAS G. SAXTON, citizens of the United States, residing at Lexington, in the county of Fayette and State of Kentucky, have invented certain new and useful Improvements in Devices for Holding Collars and Cuffs on Shirts; and we do hereby declare the following to be a full, clear, and exact description of the invention, such as will enable others skilled in the art to which it appertains to make and use the same.

Our invention relates to improvements in devices for holding collars and cuffs on shirts, and for kindred purposes, and it consists of certain improvements on the device described in our application Serial No. 474,699, filed May 18, 1893, which improvements will be hereinafter described and claimed.

Reference is had to the accompanying drawings, in which the same parts are indicated by the same letters and numerals throughout the several views.

Figure 1:
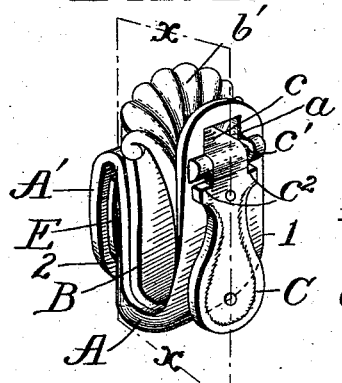
Figure 3:
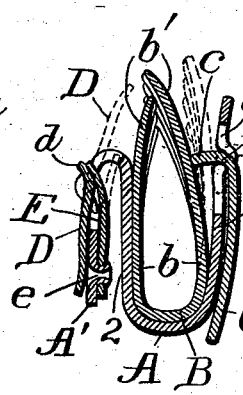
Figure 2:
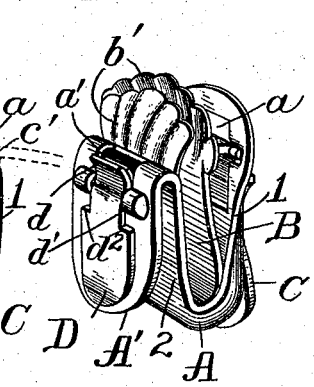
Figure 4:
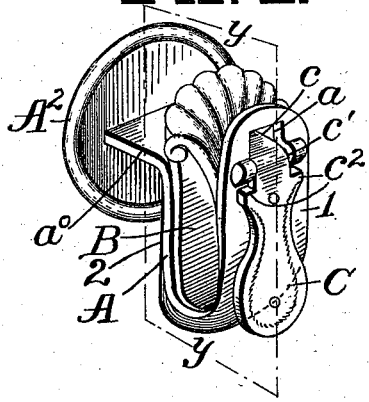
Figure 5:
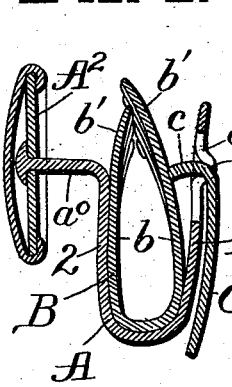
Figure 6:
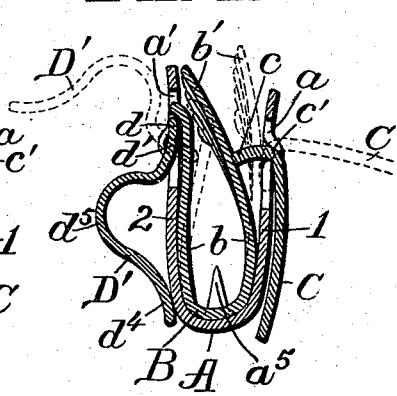
Figure 7:
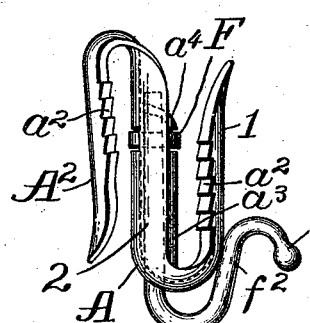
Figure 8:
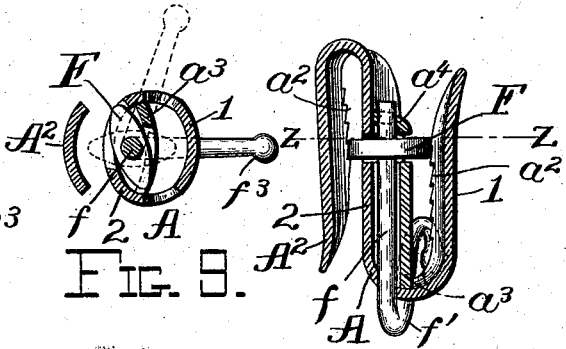

Figure 1 represents a perspective view of one form of the device as completed and ready for use. Fig. 2 represents a perspective view of the device shown in Fig. 1, but seen from the opposite side of the said figure. Fig. 3 represents a section of the device shown in Fig. 1, made by the plane $x$ $x$ of the said figure. Fig. 4 represents a perspective view of a modified form of the device, and Fig. 5 represents a section of the device shown in Fig. 4, made by the plane $y$ $y$ of the said figure. Fig. 6 represents a similar section to that shown in Figs. 3 and 5 of a slightly modified form of device, from that shown in the preceding figures. Fig. 7 represents a side elevation of another form of the device. Fig. 8 represents a central vertical section of the device shown in Fig. 7, and Fig. 9 represents a section made by the plane $z$ $z$ in Fig. 8, and looking down, the position of the cam in Fig. 8 being represented by the dotted lines.

In all the figures A represents a U-shaped frame, in which are mounted, or to which are attached, the various parts for holding the shirt, collar, or cuff. This frame consists of a front leg 1, and a rear leg 2 forming the sides of the U-shaped frame, as shown in the various figures.

In Figs. 1 to 3 the rear leg 2 is continued and bent over as at A', and the two legs are cut away as at $a$ and $a'$. Between these two legs the collar clamp B is held either by friction, or a clamp such as $a^5$ in Fig. 6 may be provided to prevent the clamp B from being detached from the frame A. This clamp B is made of resilient material, the sides $b$ of which are bent up, and the ends $b'$ of the said sides are corrugated or roughened in any way suitable for increasing the friction with the collar or cuff.

In the front leg 1 of the frame, the bent lever C is pivoted as at $c'$, and has its upper end bent inwards as at $c$. This bent end projects through the opening $a$ in the leg 1, and when the lever C is in the position indicated in the figure, it compresses the two points $b'$ together, causing them to firmly hold the collar or cuff. When this lever is turned up in the position shown in dotted lines in Fig. 3, the ends $b'$ spring apart, allowing the collar or cuff to be readily disengaged from the holder. In order that the lever C may not be turned up too far, the shoulders $c^2$ are so made as to strike against the face of the leg 1 at either side of the opening $a$, but these shoulders are not necessary, as the resiliency of the metal in the holder B will keep the end $c$ of the lever C down and the opposite end up when the said holder is open.

To the extension A' of the rear leg 2, a lever D similar to the lever C, is pivoted as at $d'$, and has a curved end projecting into the opening $a'$. The shoulders $d^2$ are provided for a similar reason to that given with regard to the shoulders $c^2$. On the inside of the extension A', a spring E is secured, as by the rivet $e$.

In order to fasten the device to the shirt, the extension A', having the spring E and the lever G in the position shown in full lines in Fig. 3, is thrust through the button hole, of the neck or wrist band of the shirt, and then the lever D is turned upward in the position shown in dotted lines in Fig 3, when the curved end $d$ will press the spring E inward, causing it to clamp the shirt between it and the rear face of the leg 2. At the same time the lever D presses the part of the band above the button hole between the back of the leg 2 and the spring E.

It will be obvious that the device may be applied either through a button hole or to a plain band of any kind, such as the neckband of a shirt. Having attached the implement to the shirt the collar or cuff holder B is opened by turning up the lever C, the collar or cuff is inserted, with the ends overlapping between the ends $b'$ of the holder, and the lever C is turned down again, thus firmly clamping the end of the collar or cuff.

The device shown in Figs. 4 and 5 is similar to that shown in Figs. 1, 2, and 3, the only difference being that the extension A' and attached parts are replaced by a collar button $A^2$ attached to the rear leg 2 by a suitable extension $a$.

In the device shown in Fig. 6, the rear leg 2 is cut off at its upper end and a bent lever D' is pivoted in the slot $a'$ as at $d'$. This lever is curved outward as at $d^5$ and terminates in a thumb lug $d^4$. In order to attach this form of device to the shirt, the lever C and the lever D' are raised to the positions shown in dotted lines in Fig. 6. The end of the lever D' is then inserted in the button hole and the lever is pushed into the button hole until stopped by the face of the leg 2, when the lever is turned down to the position shown in full lines in Fig. 6, and the resiliency of the rear leg of the collar holder B pressing on the upper end $d$ of the lever D', will cause the lower end $d^4$ to press against the shirt and hold it between the said lever and the rear face of the leg 2. The collar is clamped in place as described with reference to Figs. 1 to 3.

In the device shown in Figs. 7 to 9, the rear leg 2 of the U-shaped frame is continued and is bent over as at $A^2$, and the front leg 1 and the said continuation $A^2$ are provided with holding teeth $a^2$. Between the legs 1 and 2 the double cam F is pivotally mounted on the spindle $f$ which is bent upward as at $f'$ and so curved at $f^2$ as to bear against the front face of the leg 1 when in the open position. This operating arm of the spindle terminates in a ball or thumb lug $f^3$, so that it may not catch in the necktie. The vertical spindle $f$ is journaled in suitable bearings $a^3$ and $a^4$ in the rear side of the U-shaped frame A. In order to use the device, the cam F is turned into the position shown in Figs. 7 and 9, the tongue $A^2$ is inserted on the interior of the collar band of the shirt, or through the button hole if desired, the ends of the collar are lapped over each other in the frame A in front of the cam F, and the cam is turned in the position shown in dotted lines in Fig. 9, thus compressing the collar and shirt between the said cam and the teeth $a^2$, and holding them firmly in position.

It will be seen that the friction of the part $f^2$ on the front face of the leg 1, will keep the collar holder in the open position, and that after it is turned to the locking position, the necktie will hold the ends $f^3$ against swinging out and allowing the collar to become detached.

It will be evident that in these various devices the collar may be fitted to the neck of the wearer irrespective of the position of the button holes of the said collar, and except with the devices shown in Figs. 4 and 5, irrespective of the position of the button hole in the shirt.

It will be evident that the herein described devices are especially adapted for shirts or collars with enlarged or torn out button holes, and also for cuffs so affected.

It will be obvious that various modifications of the herein described devices might be made, which could be used without departing from the spirit of our invention.

Having thus described our invention, what we claim, and desire to secure by Letters Patent of the United States, is—

1. A device for attaching collars or cuffs to shirts comprising a U-shaped frame having two legs 1 and 2, the front leg 1 being slotted as at $a$, a U-shaped collar or cuff holder made of resilient material and provided with roughened holding arms, mounted in said frame, a bent lever pivoted to said front leg frame, projecting into said slot $a$ and adapted to press said holding arms together, an extension A' integral with said rear leg 2, bent over as shown, and slotted as at $a'$; a bent lever D pivoted in said slot, and a spring mounted on the inside of said extension and adapted to be pressed forward by said lever, substantially as and for the purposes described.

2. A device for attaching collars or cuffs to shirts comprising a U-shaped frame having its rear leg extended and slotted and curved downward, a bent lever mounted in said slotted extension, a spring mounted on the inside of said extension and adapted to be pressed forward by said lever, a U-shaped collar or cuff holder made of resilient material and provided with roughened arms mounted in said frame, and means for pressing said arms together, substantially as and for the purposes described.

3. A device for attaching collars or cuffs to shirts comprising a U-shaped frame having its rear leg extended and slotted and curved downward, a bent lever mounted in said slotted extension, a spring mounted on the inside of said extension and adapted to be pressed forward by said lever, a U-shaped collar or cuff holder made of resilient material and provided with roughened arms mounted in said frame, and a bent lever pivoted to the front of said frame and projecting into a slot therein for pressing said arms together, substantially as and for the purposes described.

In testimony whereof we affix our signatures in presence of two witnesses.

ADOLPH FEINER.
THOS. G. SAXTON.

Witnesses:
F. M. BAMELL,
FRED. A. CRAMER.